US005563393A

United States Patent [19]

Coutts

[11] Patent Number: 5,563,393

[45] Date of Patent: Oct. 8, 1996

[54] TRANSACTION TERMINAL AND PORTABLE OPERATOR INTERFACE DEVICE FOR MONITORING THE TRANSACTION TERMINAL

[75] Inventor: Michael G. Coutts, Birkhill, Scotland

[73] Assignee: AT&T Global Information Solutions Company, Dayton, Ohio

[21] Appl. No.: 407,159

[22] Filed: Mar. 20, 1995

[30] Foreign Application Priority Data

Nov. 11, 1994 [GB] United Kingdom .................. 9422846

[51] Int. Cl.[6] .................................................. G06F 17/60

[52] U.S. Cl. .......................... 235/379; 235/437; 235/385; 235/440; 235/381; 902/38; 364/479.01; 209/534

[58] Field of Search .................................... 235/379, 437, 235/385, 440, 381; 902/8, 10, 24, 39, 38; 364/479; 209/534

[56] References Cited

U.S. PATENT DOCUMENTS 4,387,296 6/1983 Newell et al. ...................... 235/385 X
5,091,713 2/1992 Horne et al. ......................... 235/381 X
5,221,838 6/1993 Gutman et al. ......................... 235/379
5,253,167 10/1993 Yoshida et al. ......................... 902/6 X
5,484,993 1/1996 Seto et al. ............................... 235/437

FOREIGN PATENT DOCUMENTS 0583896 2/1994 European Pat. Off. .
2207789 2/1989 United Kingdom .
2244583 12/1991 United Kingdom .
2244838 12/1991 United Kingdom .
2247551 3/1992 United Kingdom .

*Primary Examiner*—Donald T. Hajec
*Assistant Examiner*—Michael G. Lee
*Attorney, Agent, or Firm*—Michael Chan; Albert L. Sessler, Jr.

[57] ABSTRACT

A business system including at least one transaction terminal such as an automated teller machine ATM (10) and an interface device (12) for use by an operator in carrying out maintenance of the ATM (10) or replenishing consumable items used during its operation. The interface device (12) is separate from the ATM (10) and two-way communication between the interface device (12) and the ATM (10) is arranged to take place in a contactless manner. Preferably communication is enabled by the use of a radio frequency technique. The interface device (12) provides the operator with a sequence of instructions and is arranged to await the receipt of a confirmation signal from the ATM (10) prior to displaying the next instruction in the sequence. The ATM (10) provides the confirmation signal only when a sensor (22–44) within the ATM (10) detects that the previously displayed instruction has been carried out by the operator.

10 Claims, 7 Drawing Sheets

TRANSACTION TERMINAL AND PORTABLE OPERATOR INTERFACE DEVICE FOR MONITORING THE TRANSACTION TERMINAL

BACKGROUND OF THE INVENTION

The present invention relates to a business system including at least one transaction terminal. The invention has application, for example, to a system including a plurality of automated teller machines (ATMs).

From time to time transaction terminals require attention by an operator, as distinct from customers using the facilities provided by the terminals, for the purpose of carrying out repair or maintenance procedures, or for carrying out replenishment operations such as replenishing supplies of cash or consumable items such as paper rolls or inked ribbons.

It is known for a transaction terminal to include an operator interface device enabling an operator to check the condition or "state of health" of the terminal and to determine what attention, if any, the terminal may require.

A known operator interface device of an ATM is formed by an operator panel with an alpha-numeric display and a keypad. This known operator panel is an integral part of the ATM and is located within the ATM casing. Thus use of such an operator panel, even for such simple tasks as reviewing the ATM's diagnostic systems, has the disadvantage that it requires the operator to have access to the interior of the ATM, resulting in the ATM service being shut down. A further disadvantage of the known operator panel is that it adds significantly to the manufacturing cost of the ATM, while remaining unused for the majority of the lifetime of the ATM.

SUMMARY OF THE INVENTION

According to the present invention there is provided a business system including a transaction terminal and an operator interface device, characterized in that said interface device is separate from the transaction terminal, and two-way communication between the interface device and the terminal is arranged to take place in a contactless manner.

Preferably, the interface device incorporates a graphics display and is adapted to provide an operator with a sequence of terminal operational instructions, which may be different for different operators of the interface device.

In this way, information and instructions may be presented to the operator in an easily understood manner. An operator instruction manual may no longer be required as the interface device can provide the operator with the information necessary to operate and maintain the ATM. Also, sequential information on, for example, the replenishment of an ATM may be presented by the interface device during the replenishment procedure. Thus an operator will require little or no training prior to using the interface device.

It is accordingly an object of the present invention to provide a business system including a transaction terminal and an operator interface device, in o which the interface device is separate from the transaction terminal and two-way communication between the interface device and the terminal is arranged to take place in a contactless manner.

BRIEF DESCRIPTION OF THE DRAWINGS

An embodiment of the present invention will now be described, by way of example, with reference to the accompanying drawings, in which.

DETAILED DESCRIPTION

Figure 1:
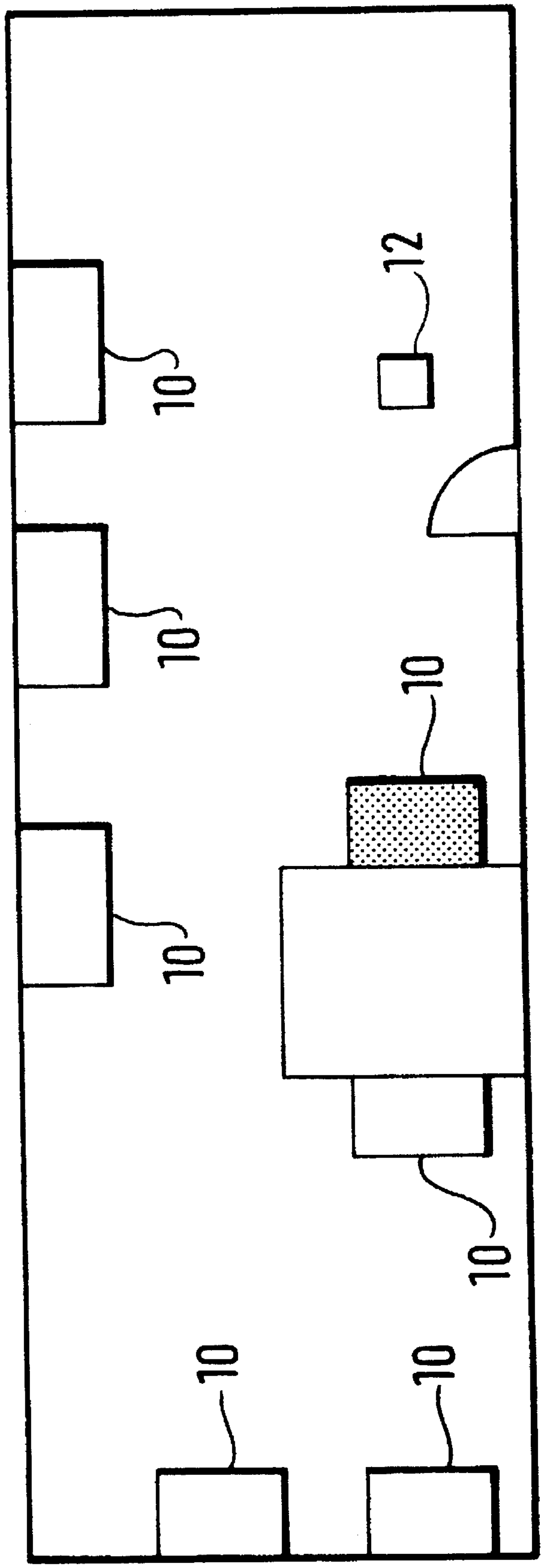
FIG. 1 is a schematic diagram of a business system in accordance with the present invention.
Figure 2:
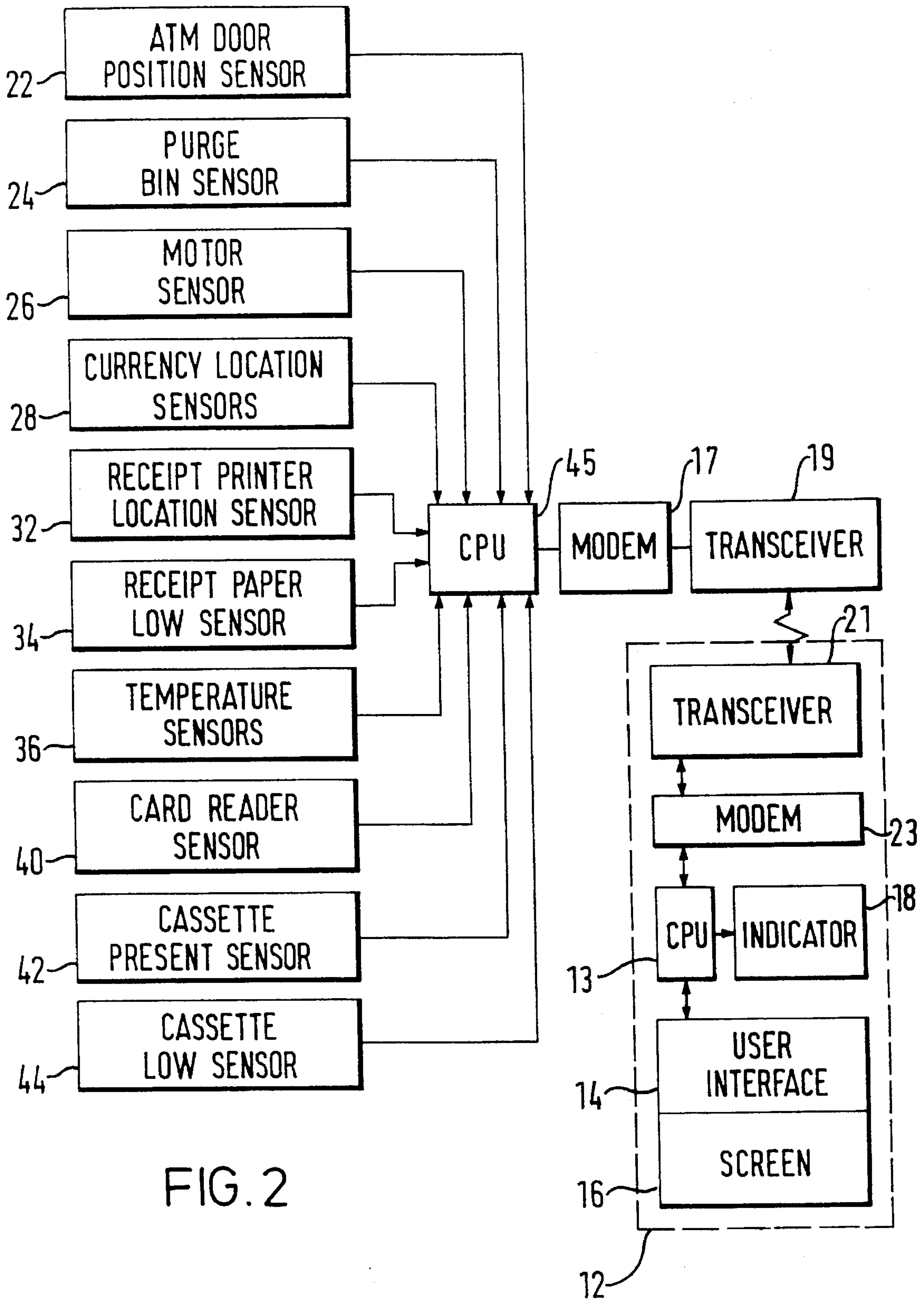
FIG. 2 is a block diagram of an interface device and of sensors and an RF communications system of an ATM which forms part of the business system of FIG. 1.
Figure 3:
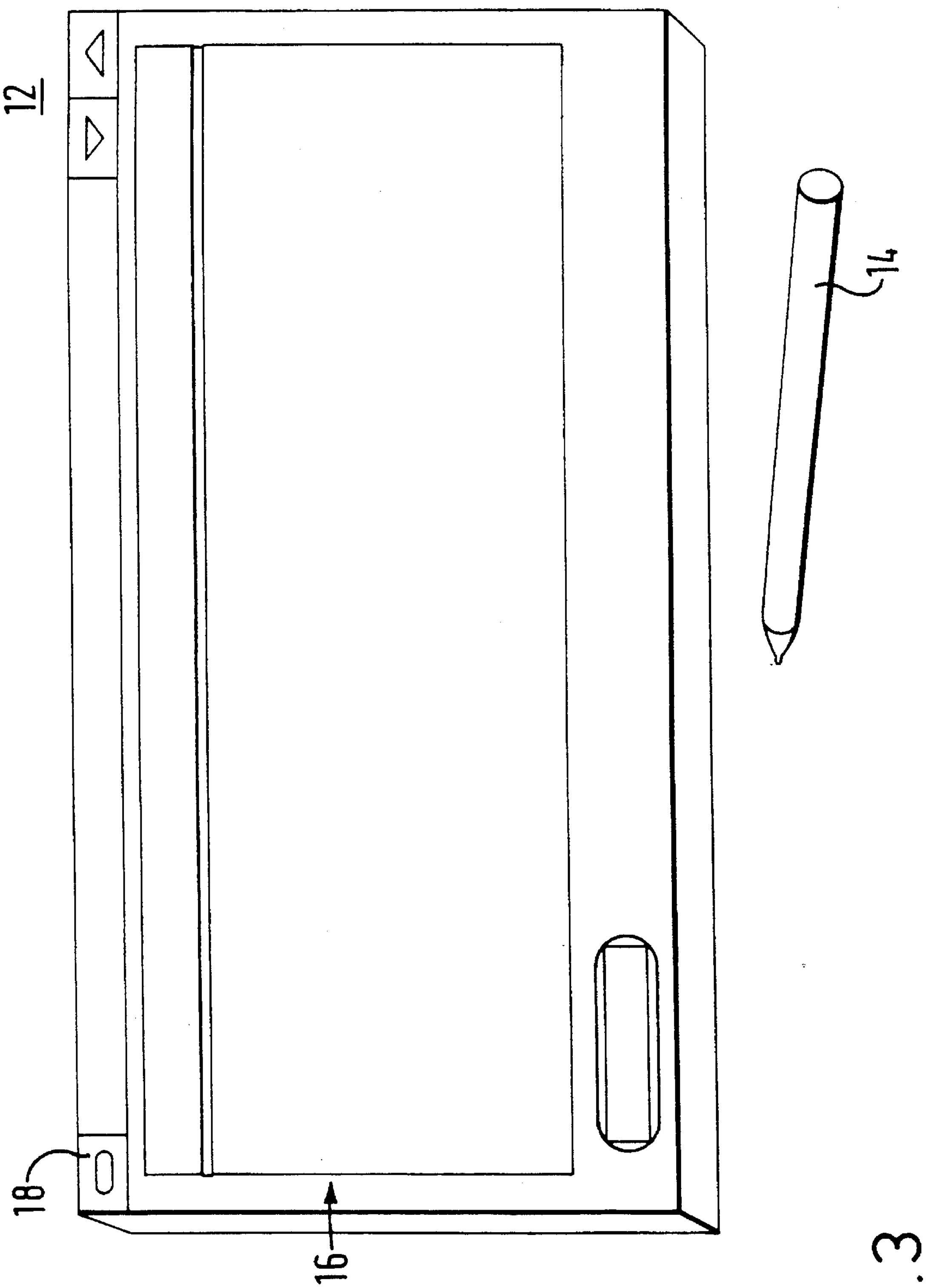
FIG. 3 is a view of the interface device of FIG. 2.
Figure 4:
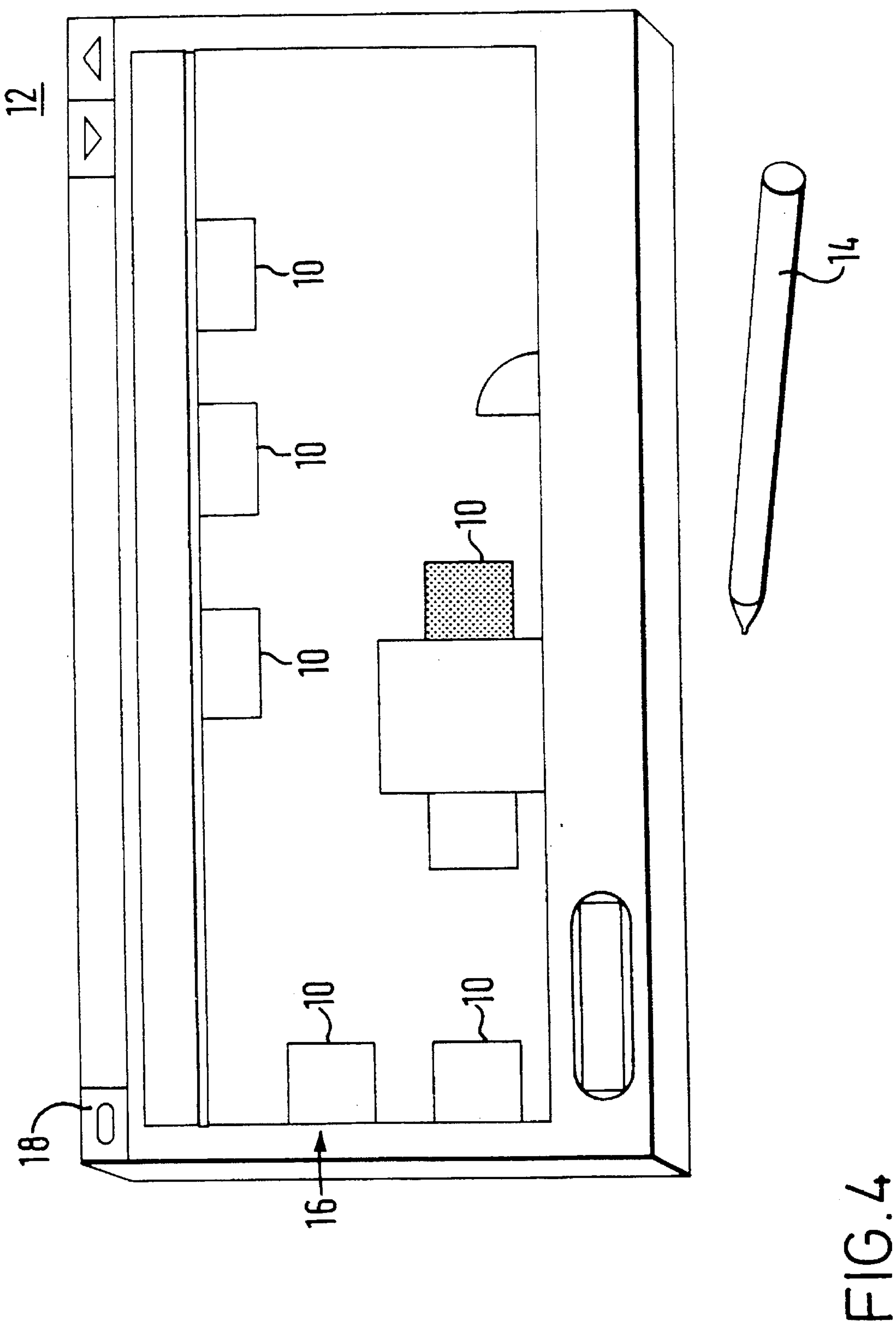
FIG. 4 shows the interface device of FIG. 3 in which the device display illustrates the business system of FIG. 1.

Referring to FIG. 1, there is shown therein a business system including a plurality of terminals, in the form of ATMs 10, and an operator interface device 12, in the form of an adapted note pad personal computer. Referring now additionally to FIGS. 2, 3 and 4, the interface device 12 comprises a 386SL central processing unit 13, a full 640× 480 VGA (Video Graphics Array) screen 16 and a pen input device 14. The operation of the operator interface device 12 will be discussed in more detail below.

The operator interface device 12 is separate from each of the ATMs 10 and two-way communication between the interface device 12 and the ATMs 10 is arranged to take place in a contactless manner. The interface device 12 is portably movable between a first position adjoining one of the ATMs 10 and a second position spaced apart no more than a predetermined distance from that ATM. This allows an operator to move the interface device 12 between the first and second positions while monitoring the state of health information associated with that ATM, and carrying out a maintenance operation which depends upon the state of health information associated with that AMT.

In particular, a radio-frequency (RF) communication technique is used for communication between the interface device 12 and the ATMs 10. To enable such communication to take place, the interface device includes a transceiver 21 and each of the ATMs 10 includes a transceiver 19 as illustrated in FIG. 2. The device 12 may transmit on one or more of the frequency bands designated for industrial, scientific and medical RF communications. Thus the interface device 12 is not required to be in a direct line of sight of the ATMs 10 in order to enable two way communication between the device 12 and the ATMs 10.

The device 12 and each ATM 10 respectively incorporate modems 23 and 17 in order to enable the modulation of data signals for RF transmission between the ATMs 10 and the device 12, and the demodulation of received data signals. The device 12 is adapted to use a modem in the form of a PCMCIA (Personal Computer Memory Card International Association) integrated circuit card, configured to operate as a modem. The device 12 includes a slot (not shown) which receives the PCMCIA card prior to use of the device 12. The device 12 is arranged such that once the PCMCIA card is inserted into the slot it is connected between the transceiver 2 1 and the central processor unit 13. Alternatively, the PCMCIA card can be arranged to incorporate a modem and a transceiver within a single package.

In the present embodiment, the ATMs 10 are each arranged to transmit a signal alerting the interface device 12 to the fact that the ATM 10 requires attention. The condition of an ATM 10, i.e. whether or not the ATM 10 requires attention and the kind of attention required, is known as the "state of health" of the ATM 10.

Thus the interface device 12 can obtain terminal state of health information from each of the ATMs 10 in the system at a location remote from the ATMs 10. As the operator does not need to actively interrogate each ATM 10 for state of health information nor obtain access to the interior of an ATM 10 in order to obtain state of health information the average down time of each ATM 10 will be reduced.

State of health signals generated by the ATMs 10 also include warnings prior to a problem arising or becoming critical. For example, a state of health signal may be generated when a consumable product used by an ATM 10, such as receipt printer paper, is low. The quantity of receipt paper within the ATM is monitored by a receipt paper sensor 34 (FIG. 2). In this way replenishment of each of the ATMs 10 may be planned by the operator for minimum inconvenience both to the operator and the customers who use the ATMs 10.

The operation of the interface device 12 by an operator is carried out in a known manner. Text is entered into the interface device 12 using character recognition techniques with the user writing on the device screen 16 using the pen device 14 (FIGS. 3 and 4).

Figure 5:
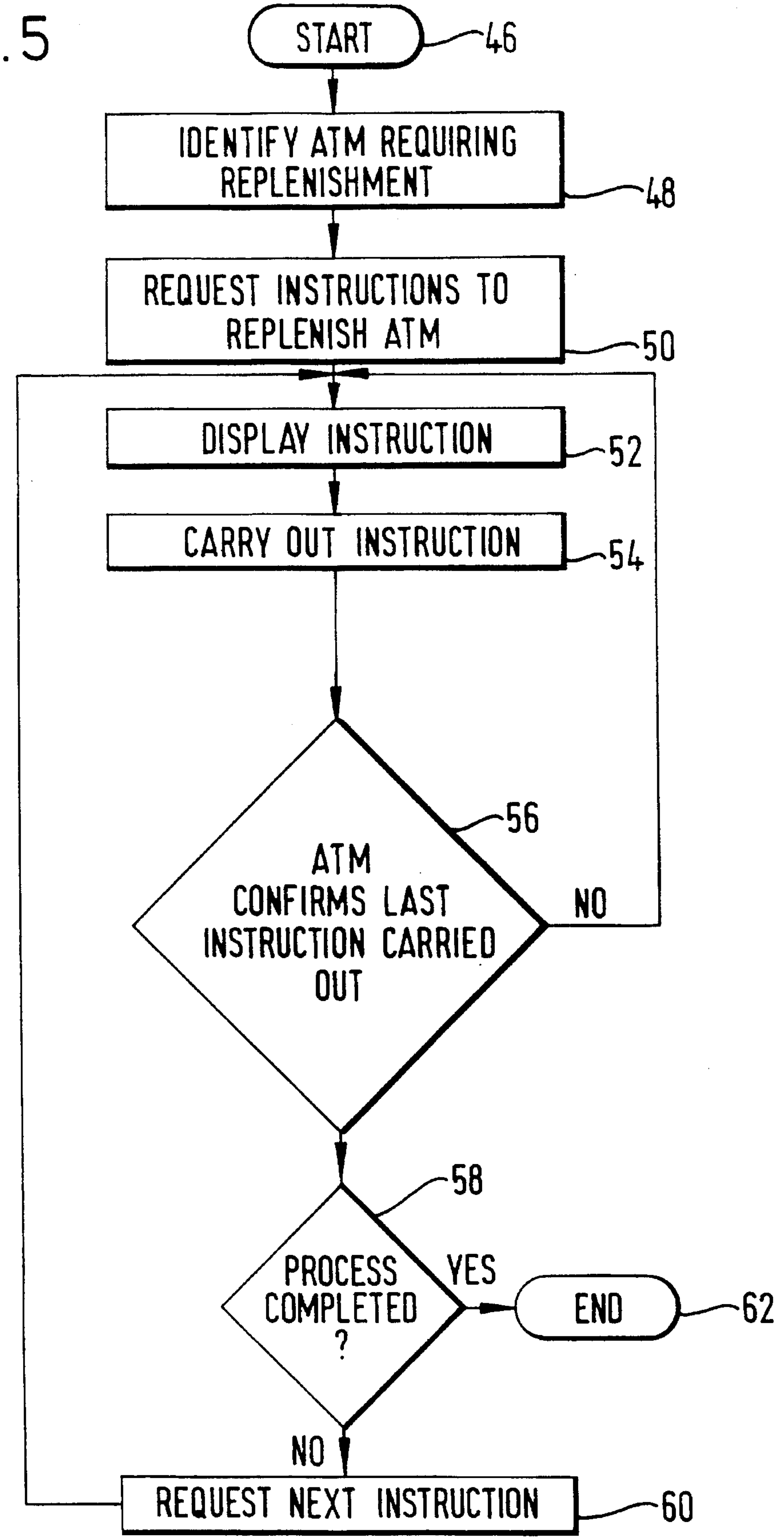
FIG. 5 is a flow diagram of the process used by the operator in order to replenish a terminal in the business system of FIG. 1.

The screen 16 of the interface device 12 provides a graphics display 16 which is adapted to provide the operator with a sequence of terminal information or operational instructions to enable the operator to carry out, for example, a maintenance operation such as replenishing the ATM in accordance with the process illustrated in FIG. 5.

As a variety of operators need to interface with the ATM 10, the interface device 12 is adapted to provide different levels of operational instructions to different operators. For example, a bank or building society employee responsible for replenishment of the ATMs 10 will be provided with a level of instruction relating only to replenishment tasks whereas a service engineer will be provided with different levels of instruction including access to diagnostics and problem solving processes. The various levels of instructions may be accessed by a code number input into the device by the operator, through the use of character recognition techniques as discussed above. Also an authorization card, which could be inserted into the device prior to operation, or any other suitable security means, may be utilised.

The interface device may be used by an operator for many different purposes including: replenishing items consumed during operation of the ATM 10; rectifying a malfunction of the ATM 10; and obtaining terminal state of health data.

Each ATM 10 is capable of providing a customer who withdraws cash from the ATM 10 with a printed receipt showing details of the transaction. The receipt is printed by a printer within the ATM 10, on receipt paper which is stored on a roll within the ATM 10. Therefore, during normal operation of the ATM 10, items including currency notes, receipt paper and ink are consumed by the ATM 10, and need to be replenished periodically. Also, at some time currency may become jammed in a currency feed path within a cash dispenser unit of the ATM 10. Clearly, the ATM 10 will not operate correctly until any such jam is cleared.

The operation and condition or state of health of each ATM 10 is monitored by a plurality of sensors 22–44 (FIG. 2) positioned within the ATM 10. These sensors 22–44 provide information on the state of health of the ATM 10 to enable ease of maintenance of the ATM 10, i.e. to enable convenient replenishment of consumable items within the ATM 10 and rapid rectification of ATM malfunctions. The sensors 22–44 provide information signals to a central processing unit 45 of the ATM 10 which in turn causes appropriate information signals to be transmitted to the interface device 12 via the modem 17 and transceiver 19.

When presenting instructions to the operator, the interface device 12 is arranged to await the receipt of a confirmation signal from the ATM 10 confirming that an operational instruction has been carried out by the operator before a subsequent operational instruction is presented to the operator by the interface device 12. The ATM 10 is correspondingly arranged to test whether or not a task has been carried out by the operator as instructed before transmitting a confirmation signal to the interface device 12.

The general principles of the device 12 providing sequential replenishment instructions to the operator and arranging the device 12 to await confirmation from an ATM 10 that an instruction has been carried out before the next instruction is provided are illustrated in FIG. 5. Also, it should be noted that a check is made by the device 12 as to whether the replenishment process has been completed before a further instruction is displayed. The operator is prompted to request instructions from the device 12 regarding the replenishment procedure and the malfunction rectification procedure by an ATM 10 transmitting a signal to the device 12 which activates an audio signal and displays a message on the device display 16 indicating that an ATM requires attention. An indicator 18 in the form of a red and a green light emitting diode (LED) (FIGS. 3, 4) may also be provided to indicate that an ATM is in a good or a non-good state.

A particular replenishment process involving the replacement of receipt paper will now be described with reference to FIG. 5. From the start block 46 of the replenishment process the first step is to identify which of the ATMs 10 requires replenishment (block 48). This is achieved, as illustrated in FIG. 4, by the operator calling up a graphical display of the business system on the device display 16 in which the ATM 10 requiring replenishment is highlighted by shading. The next step (block 50) is for the operator to request information on which consumable product requires replenishment together with instructions on how the consumable product is to be replenished. The device 12 will then display the first instruction (block 52) which is to open the door providing access to the interior of the ATM 10. The operator must now carry out this instruction (block 54) and a door position sensor 22 (FIG. 2) within the ATM 10 will detect that the instruction has been carried out (block 56). If the sensor 22 does not detect the opening of the door then a confirmation signal will not be sent to the device 12 and the first instruction would be repeated by the device 12 in place of the next instruction in the sequence.

Assuming the first instruction is carried out correctly, the device 12 will check (block 58) whether the replenishment process has been completed. Since at this stage the process has not been completed, the user requests the next instruction (block 60), which is to withdraw the receipt printer from its position inside the housing for the purpose of replacing the empty receipt roll by a new receipt roll. This instruction will be displayed on the device screen 16 (block 52). Again, the device 12 will await confirmation from the ATM 10 that this instruction has been followed by the operator (block 56) and will check whether the replenishment process has been completed (block 58) prior to allowing the user to request the next instruction (block 60). Confirmation from the ATM 10 that the receipt printer has been withdrawn from the housing by the operator is provided by an appropriate signal from a receipt printer location sensor 32 (FIG. 2). The device 12 will then proceed through the remaining instructions to the operator which are to reposition the receipt printer in the "in use" position in the ATM 10 (confirmed by an appropriate signal from the sensor 32) and to close the door to the ATM 10 (confirmed by an appropriate signal from the sensor 22). These steps having been carried out and confirmed by the ATM 10, the replenishment process will have been completed (block 58) and the device 12 will inform the operator that the sequence of instructions has ended (block 62). The ATM 10 will then be operational.

Figure 6:
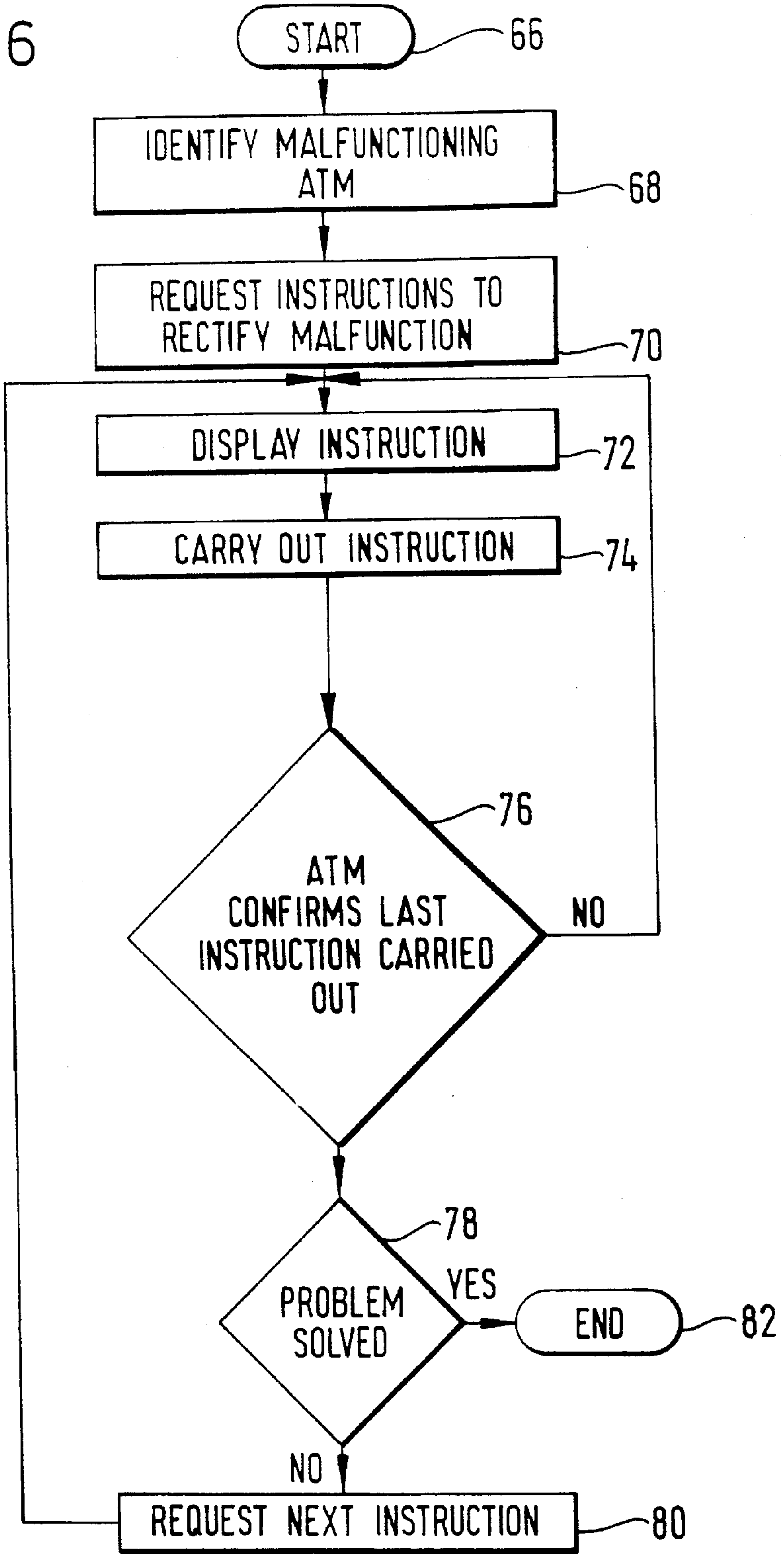
FIG. 6 is a flow diagram of the process used by the operator in order to rectify a malfunction in a terminal in the business system of FIG. 1.

FIG. 6 illustrates an analogous process through which a malfunction of an ATM 10 can be identified and rectified. For example, an ATM 10 in accordance with the present invention may malfunction due to currency jamming.

The process for rectifying a malfunction due to currency jamming will now be described with reference to FIG. 6. In this case, from start block 66 the operator proceeds to identify the malfunctioning ATM 10 (block 68) by calling up a graphical display of the business system on the device screen 16 which would be similar to that of FIG. 4, the ATM 10 requiring attention again being highlighted by shading. The operator then proceeds to block 70 and requests instructions to rectify the malfunction. The device 12 displays the first instruction in the sequence (block 72), this being to open the door to the interior of the ATM 10. The operator carries out this instruction (block 74) and the sensor 22 (FIG. 2) within the ATM 10 detects the opening of the door. The ATM 10 then sends a confirmation signal to the device that the first instruction has been carried out (block 76) and the device 12 checks (block 78) whether the malfunction has been rectified. Since at this stage the malfunction has not been rectified, the next sequential instruction will be requested by the operator (block 80). As the ATM 10 incorporates currency location sensors 28 (FIG. 2), the next instruction as displayed on the screen 12 includes information as to the location of the currency jam together with an instruction to the operator to remove the jammed currency. Assuming this instruction is also carried out by the operator and confirmed by the ATM 10 (by way of appropriate signals from the sensors 28), the next instruction, to close the door to the interior of the ATM 10, will be presented to the operator. When this instruction is followed by the operator and the ATM 10 confirms that the door is closed, the malfunction will be rectified (block 78) and the sequence of instructions will be terminated (block 82). The ATM 10 will now again be operational. It should be understood that, as in the case of the process described with reference to FIG. 5, if the relevant ATM 10 fails to confirm that an instruction received by the operator has been carried out (block 76) (FIG. 6) then the same instruction will be repeated (block 72) (FIG. 6) until the instruction has been carried out correctly by the operator.

Figure 7:
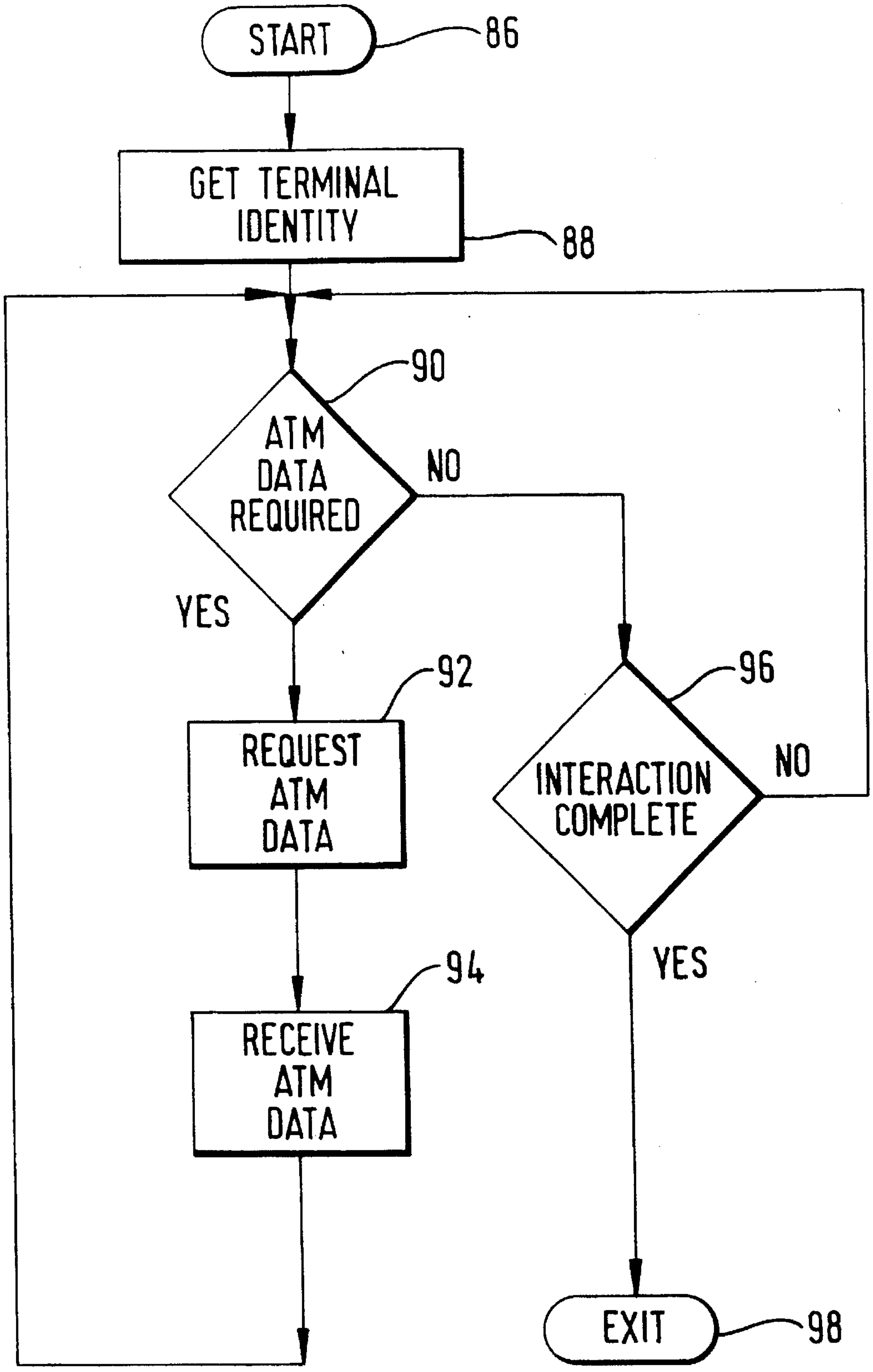
FIG. 7 is a flow diagram of the process used in obtaining terminal state of health information.

The device 12 can also be utilised to obtain state of health information for each of the ATMs 10 in the business system, as illustrated in FIG. 7. As shown in FIG. 2, each ATM 10 in the business system incorporates a plurality of different sensors 22–44 which monitor the condition and operation of the ATM 10. These sensors 22–44 include the door position sensor 22 as described above, a purge bin sensor 24 used to monitor the number of occasions currency notes are deposited in a purge bin (not shown) of the ATM 10 and therefore the number of incorrect picking operations carried out by the ATM 10, a motor sensor 26 which monitors the speed of the motor which drives the conveyor means for transporting currency through the ATM 10, the currency location sensors 28, the receipt printer location sensor 32 and the o receipt paper low sensors 34 referred to above, temperature sensors 36 which monitor ambient temperature within the ATM 10, a reader sensor 40 which counts the number of times the card reader is used so that the card reader can be replaced after a predetermined usage, cassette present sensors 42 which detect the presence of the currency cassettes for holding supplies of currency notes, and cassette low sensors 44 which detect when the supply of currency in each cassette is running low and the cassette should be replaced. Data from all of these sensors 22–44 and any other sensors within each ATM 10 are supplied to the device 12 via the RF transceiver 19 in the ATM 10.

As illustrated in FIG. 7, ATM state of health information can be requested by the operator who first identifies an ATM 10 the state of health of which is required (block 88). State of health information can be obtained by the operator at any time without a particular problem having arisen with an ATM 10 i.e. without any particular ATM 10 informing the device 12 that it requires attention. If data is required (block 90) the operator then requests data (block 92) which is transmitted to the device 12 by the ATM 10 and presented to the operator (block 94). This process is continued until no further data is required (block 90). If the operator does not require any further information from the ATM 10, the interaction is completed (block 96) and the operator will exit the data retrieval process (block 98).

The interactive instruction process is particularly useful to ensure that safety procedures are carried out and that even inexperienced staff can not make an undetected mistake in the replenishment or malfunction correction processes.

Thus, the graphics screen 16 and the interactive nature of the instruction process provided by the interface device 12 result in an intuitive device which may be used considerably more easily and conveniently by operators than known interface devices.

What is claimed is:

1. A business system comprising:

a transaction terminal having state of health information associated therewith;

a portable note pad personal computer separate from the transaction terminal and operable to monitor the state of health information associated with the transaction terminal and to carry out a maintenance operation which depends upon the state of health information associated with the transaction terminal;

the portable note pad personal computer being portably movable between a first position adjoining the transaction terminal and a second position spaced apart no more than a predetermined distance from the transaction terminal to allow an operator to move the portable note pad personal computer between the first and second positions while monitoring the state of health information associated with the transaction terminal and carrying out a maintenance operation which depends upon the state of health information associated with the transaction terminal; and two-way communication means for supporting communication between the portable note pad personal computer and the transaction terminal in a contactless manner.

2. A system according to claim 1, wherein two-way communications means includes a radio frequency communication device for communication between the portable note pad personal computer and the transaction terminal.

3. A system according to claim 1, further comprising a plurality of sensors within the transaction terminal, the transaction terminal transmitting a signal to the portable note pad personal computer when a condition requiring the attention of an operator is detected by one or more of the sensors within the transaction terminal.

4. A system according to claim 3, wherein the portable note pad personal computer is adapted to provide the operator with a sequence of terminal operational instructions.

5. A system according to claim 4, wherein the portable note pad personal computer is adapted to provide different terminal operational instructions for different operators.

6. A system according to claim 4, wherein the portable note pad personal computer is arranged to await the receipt of a confirmation signal from the transaction terminal before displaying a subsequent operational instruction, the confirmation signal being transmitted when one of the sensors within the transaction terminal senses that the operational instruction has been carried out.

7. A system according to claim 1, wherein the portable note pad personal computer includes a graphics display.

8. A system according to claim 1, wherein the portable note pad personal computer includes indicator means for providing an indication that the transaction terminal requires attention.

9. A system according to claim 1, further comprising at least another transaction terminal which is in communication with the portable note pad personal computer, the nature of the communication and the type of information that can be communicated between each transaction terminal and the portable note pad personal computer being similar for each transaction terminal.

10. A system according to claim 9, wherein each of the transaction terminals is an automated teller machine.

* * * * *